US010339708B2

(12) United States Patent
Lynen et al.

(10) Patent No.: US 10,339,708 B2
(45) Date of Patent: Jul. 2, 2019

(54) MAP SUMMARIZATION AND LOCALIZATION

(71) Applicant: Google Inc., Mountain View, CA (US)

(72) Inventors: Simon Lynen, Zürich (CH); Bernhard Zeisl, Zürich (CH)

(*) Notice: Subject to any disclaimer, the term of this patent is extended or adjusted under 35 U.S.C. 154(b) by 0 days.

(21) Appl. No.: 15/659,358

(22) Filed: Jul. 25, 2017

(65) Prior Publication Data

US 2018/0122136 A1     May 3, 2018

Related U.S. Application Data

(60) Provisional application No. 62/416,078, filed on Nov. 1, 2016.

(51) Int. Cl.
*G06T 17/00*     (2006.01)
*G06T 17/05*     (2011.01)
(Continued)

(52) U.S. Cl.
CPC .............. *G06T 17/05* (2013.01); *G01C 17/38* (2013.01); *G01C 21/20* (2013.01); *G05D 1/0274* (2013.01); *G06F 1/1694* (2013.01); *G06F 1/325* (2013.01); *G06F 3/038* (2013.01); *G06K 9/00664* (2013.01); *G06K 9/00671* (2013.01); *G06K 9/623* (2013.01); *G06T 7/246* (2017.01); *G06T 7/73* (2017.01); *G06T 19/003* (2013.01);
(Continued)

(58) Field of Classification Search
None
See application file for complete search history.

(56) References Cited

U.S. PATENT DOCUMENTS 7,746,343 B1 * 6/2010 Charaniya ............ G06F 3/04815
345/428
8,705,792 B2 * 4/2014 James ..................... G06T 7/246
348/169
(Continued)

FOREIGN PATENT DOCUMENTS

FR           3025898     3/2016
WO     2017027562     2/2017

OTHER PUBLICATIONS

Dymczyk, M. et al., "The Gist of Maps—Summarizing Experience for Lifelong Localization", Washington State Convention Center, May 26-30, 2015, 7 pages.
(Continued)

*Primary Examiner* — Martin Mushambo

(57) ABSTRACT

An electronic device generates a summary map of a scene based on data representative of objects having a high utility for identifying the scene when estimating a current pose of the electronic device and localizes the estimated current pose with respect to the summary map. The electronic device identifies scenes based on groups of objects appearing together in consistent configurations over time, and identifies utility weights for objects appearing in scenes, wherein the utility weights indicate a predicted likelihood that the corresponding object will be persistently identifiable by the electronic device in the environment over time and are based at least in part on verification by one or more mobile devices. The electronic device generates a summary map of each scene based on data representative of objects having utility weights above a threshold.

17 Claims, 9 Drawing Sheets

(51) Int. Cl.

| | | |
|---|---|---|
| G06T 7/246 | (2017.01) | |
| G06T 7/73 | (2017.01) | |
| G06K 9/00 | (2006.01) | |
| G06K 9/62 | (2006.01) | |
| G06T 19/00 | (2011.01) | |
| G01C 17/38 | (2006.01) | |
| G01C 21/20 | (2006.01) | |
| G05D 1/02 | (2006.01) | |
| G06F 1/16 | (2006.01) | |
| G06F 1/3234 | (2019.01) | |
| G06F 3/038 | (2013.01) | |
| G06F 3/01 | (2006.01) | |
| G01C 17/28 | (2006.01) | |
| G06F 3/0346 | (2013.01) | |

(52) U.S. Cl.
CPC .............. *G01C 17/28* (2013.01); *G06F 3/012* (2013.01); *G06F 3/0346* (2013.01); *G06K 9/00241* (2013.01); *G06T 2207/10028* (2013.01); *G06T 2207/20076* (2013.01); *G06T 2207/20081* (2013.01)

(56) References Cited

U.S. PATENT DOCUMENTS

| | | | | |
|---|---|---|---|---|
| 9,495,783 | B1* | 11/2016 | Samarasekera | G06T 11/60 |
| 9,563,813 | B1* | 2/2017 | Smith | G06K 9/00214 |
| 9,898,677 | B1* | 2/2018 | Anjelkovi | G06K 9/3241 |
| 2003/0036849 | A1* | 2/2003 | Ford | G01C 21/28 |
| | | | | 701/469 |
| 2004/0085293 | A1* | 5/2004 | Soper | G06F 17/30241 |
| | | | | 345/156 |
| 2007/0257903 | A1* | 11/2007 | Gutierrez | G06T 17/05 |
| | | | | 345/419 |
| 2009/0296989 | A1* | 12/2009 | Ramesh | G06K 9/00771 |
| | | | | 382/103 |
| 2012/0306850 | A1 | 6/2012 | Balan et al. | |
| 2013/0182947 | A1* | 7/2013 | Wang | G06T 7/0042 |
| | | | | 382/159 |
| 2013/0206177 | A1 | 8/2013 | Burlutskiy | |
| 2013/0223686 | A1* | 8/2013 | Shimizu | G08G 1/166 |
| | | | | 382/103 |
| 2013/0300740 | A1* | 11/2013 | Snyder | G06F 3/016 |
| | | | | 345/420 |
| 2014/0149376 | A1* | 5/2014 | Kutaragi | G06K 9/4676 |
| | | | | 707/706 |
| 2014/0198129 | A1* | 7/2014 | Liu | G06F 3/04815 |
| | | | | 345/633 |
| 2014/0241614 | A1* | 8/2014 | Lee | G06T 7/0018 |
| | | | | 382/154 |
| 2015/0071490 | A1* | 3/2015 | Fukata | G06K 9/00791 |
| | | | | 382/103 |
| 2015/0278601 | A1* | 10/2015 | Nagamine | G06T 7/277 |
| | | | | 382/103 |
| 2016/0180602 | A1* | 6/2016 | Fuchs | G06F 3/012 |
| | | | | 463/31 |
| 2017/0046594 | A1 | 2/2017 | Nerurkar et al. | |
| 2017/0099200 | A1* | 4/2017 | Ellenbogen | H04L 43/04 |
| 2017/0123429 | A1* | 5/2017 | Levinson | G05D 1/0088 |
| 2017/0124781 | A1* | 5/2017 | Douillard | B60Q 1/26 |
| 2017/0254651 | A1* | 9/2017 | Resende | G05D 1/0248 |
| 2018/0089895 | A1* | 3/2018 | Anderson | G06T 19/006 |

OTHER PUBLICATIONS

Invitation to Pay Additional Fees and, Where Applicable, Protest Fee for PCT Application No. PCT/US2017/058260, 21 pages.

Dymczyk Marcin, et al., Keep It Brief: Scalable creation of compressed maps, 2015 IEEE/RSJ International Conference on Intelligent Robots and Systems (IROS), IEEE, Sep. 28, 2015, Hamburg, Germany, pp. 2536, XP032831990, DOI: 10.1109/IROS.2015.7353722 Section I, 7 pages.

International Search Report and Written Opinion of the International Searching Authority dated Apr. 3, 2018 for PCT Application No. PCT/US2017/058260, 21 pages.

Second Written Opinion dated Sep. 17, 2018 for PCT/US2017/058260, 8 pages.

\* cited by examiner

MAP SUMMARIZATION AND LOCALIZATION

CROSS-REFERENCE TO RELATED APPLICATIONS

The present application is related to and claims priority to the following co-pending application, the entirety of which is incorporated by reference herein: U.S. Provisional Patent Application Ser. No. 62/416,078, entitled "Methods and Systems for VR/AR Functionality in a Portable Device," filed Nov. 1, 2016.

BACKGROUND

Field of the Disclosure

The present disclosure relates generally to imagery capture and processing and more particularly to machine vision using captured imagery.

Description of the Related Art

Machine vision and display techniques, such as simultaneous localization and mapping (SLAM), structure from motion (SFM), visual inertial odometry (VIO), and visual inertial mapping, used for augmented reality (AR) and virtual reality (VR) applications, often rely on the identification of objects within the local environment of a device through the analysis of imagery of the local environment captured by the device. To support these techniques, the device navigates an environment while simultaneously constructing a map (3D visual representation) of the environment or augmenting an existing map or maps of the environment. The device may also incorporate data based on imagery captured by other devices into the 3D visual representation. However, as the amount of captured imagery data accumulates over time, the 3D visual representation can become too large for the computational budget of a resource-constrained mobile device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
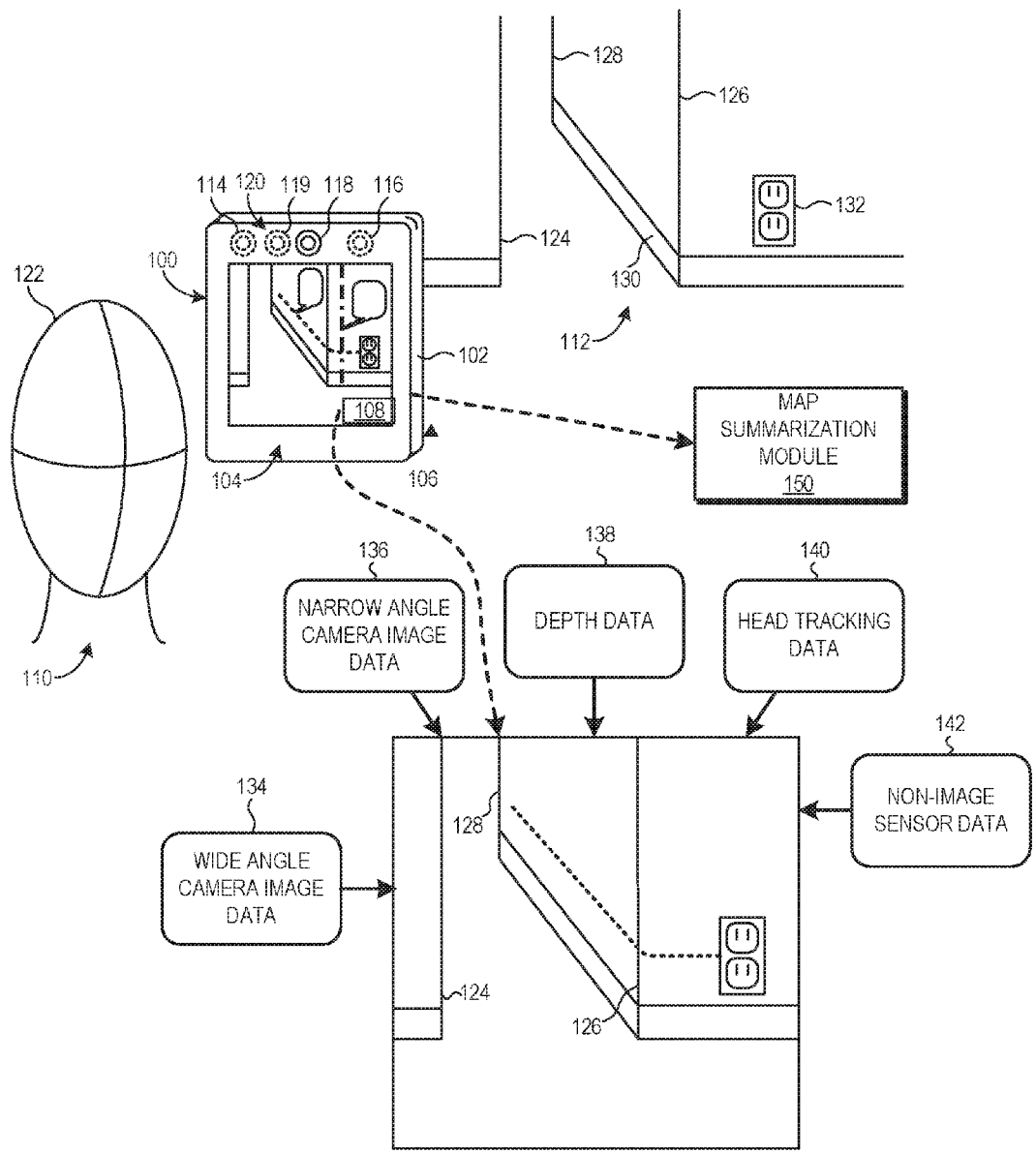
FIG. 1 is a diagram illustrating an electronic device configured to generate a summary map of a scene based on an estimated utility of the visual anchors derived from the scene appearance and geometry (referred to herein as the "utility of objects") in the scene in accordance with at least one embodiment of the present disclosure.

The following description is intended to convey a thorough understanding of the present disclosure by providing a number of specific embodiments and details involving the generation of a summary map of a scene in a local environment of an electronic device based on an estimated utility of objects in the scene. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-9 illustrate techniques for generating a summary map of a scene based on data representative of objects having a high utility for identifying the scene when estimating a current pose of the electronic device and localizing the estimated current pose with respect to the summary map. A tracking module receives sensor data from visual, inertial, and depth sensors and tracks motion (i.e., estimates poses over time) of the electronic device that can be used by an application programming interface (API). The motion tracking module estimates poses over time based on semantic data, pixel data, and/or feature descriptors corresponding to the visual appearance of spatial features of objects in the environment (referred to as object data) and estimates the three-dimensional positions and orientations (referred to as 3D point poses) of the spatial features.

In at least one embodiment, the motion tracking module also provides the captured object data to a scene module and a scoring module. The scene module performs learning over time and adapts its behavior based on data through machine learning. In some embodiments, the scene module is configured to identify groups of objects appearing together in consistent configurations over time or over a plurality of motion tracking sessions based on the captured object data received from the motion tracking module and stored object data received from previous motion tracking sessions and/or captured by other electronic devices in previous or concurrent motion tracking sessions.

The scene module provides the identified scene to a scoring module, which is configured to identify utility weights for the objects represented by the object data for identifying the scenes in which the objects appear. The scoring module uses a number of metrics for identifying utility weights for objects, such as, for example, the persistence of an object in a scene over time or over a number of visits to the scene, how recently the object appeared in the scene, the consistency of the appearance of an object in a scene over time or over a number of visits to the scene, and the number of viewpoints of the object that have been captured by the electronic device or by other electronic devices. The scoring module filters the object data to identify those objects having utility weights above a threshold (referred to as high utility weight objects), and provides data representative of the high utility weight objects to a mapping module.

The summary map generator is configured to store a plurality of maps based on stored high utility weight object data, and to receive additional high utility weight object data from the scoring module as it is generated by the motion tracking module while the electronic device moves through the environment. The summary map generator generates a summary map for each identified scene based on the high utility weight object data for the corresponding scene. In response to receiving additional high utility weight object data for a scene, the summary map generator identifies an updated utility weight threshold for the scene and buffers or discards any object data for the scene having a utility weight below the updated threshold for the scene. In some embodiments, the buffered object data is stored for later processing by the electronic device. In some embodiments, the buffered object data is provided to a server for offline processing. The summary map generator generates an updated summary map for the scene based on the high utility weight object data having utility weights at or above the updated threshold for the scene.

The summary map generator provides the summary map of the scene to a localization module, which compares cues derived from visual and depth data to stored cues from the stored plurality of maps, and identifies correspondences between stored and observed cues. In some embodiments, the cues include feature descriptors. The localization module performs a loop closure by minimizing discrepancies between matching cues to compute a localized pose. The localized pose corrects drift in the estimated pose generated by the motion tracking module, and is periodically sent to the motion tracking module for output to the API.

By generating summary maps of scenes (also referred to as scene reference maps) based on high utility weight object data and buffering or discarding object data having lower utility weights, the electronic device can generate and maintain scene reference maps having a constrained or constant size using a smaller quantity of higher quality data that improves over multiple visits to the same scene. On subsequent visits to the same scene, the electronic device can localize its estimated pose within a scene with respect to a stored summary map of the scene. To illustrate, in at least one embodiment the map summarization module generates object data representative of objects based on visual and inertial sensor data captured by visual and non-visual sensors and identifies groups of objects appearing together. The map summarization module identifies scenes based on groups of objects appearing in consistent configurations and identifies utility weights for objects appearing in the scenes, wherein the utility weights indicate a predicted likelihood that the corresponding object will persist in the environment over time and that it can be reliably redetected and identified. In response to identifying that the object data based on captured visual and inertial sensor data does not match the most recently visited scene, the map summarization module stores the current scene in a first scene file for later use and accumulates object data for a new scene in a second scene file. The map summarization module generates and updates a summary map for each scene based on object data having a utility weight above a threshold such that the size of each summary map is constrained. In some embodiments, the map summarization module selectively merges and jointly compresses multiple scene files. The map summarization module localizes the estimated pose of the electronic device with respect to a summary map for the scene matching the scene of the estimated pose.

FIG. 1 illustrates an electronic device 100 configured to support location-based functionality using SLAM for AR/VR applications, using image and non-visual sensor data in accordance with at least one embodiment of the present disclosure. The electronic device 100 can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, camera attachments with or without a screen, and the like. In other embodiments, the electronic device 100 can include another type of mobile device, such as an automobile, robot, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example, thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging sensors 114 and 116 and a depth sensor 120 disposed at the forward-facing surface 106 and an imaging sensor 118 disposed at the user-facing surface 104. In one embodiment, the imaging sensor 114 is implemented as a wide-angle imaging sensor having a fish-eye lens or other wide-angle lens to provide a wider-angle view of the local environment 112 facing the surface 106. The imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively. As described in greater detail below, the wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging sensor 118 can be used to capture image data for the local environment 112 facing the surface 104. Further, in some embodiments, the imaging sensor 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging sensors 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging sensors 114 and 116. Alternatively, the depth data from the depth sensor 120 may be used in place of depth information obtained from image analysis.

The electronic device 100 also may rely on non-visual pose information for pose detection. This non-visual pose information can be obtained by the electronic device 100 via a one or more non-visual sensors (not shown in FIG. 1), such as an IMU including one or more gyroscopes, magnetometers, and accelerometers. In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-visual sensors can also include ambient light sensors and location sensors, such as GPS sensors, or other sensors that can be used to identify a location of the electronic device 100, such as one or more wireless radios, cellular radios, and the like.

To facilitate localization within a scene, the electronic device 100 includes a map summarization module 150 to generate a summary map of the scene based on data based on the image sensor data 134, 136 and the non-image sensor data 142 that is representative of objects having a high utility for identifying the scene when estimating a current pose of the electronic device 100, and to localize the estimated current pose with respect to the summary map. The map summarization module 150 identifies utility weights for objects within a scene, wherein the utility weights indicate a likelihood that the corresponding object will be persistently identifiable by the electronic device in the environment over time. The utility weights are based on characteristics of the object such as the persistence of an object in a scene over time or over a number of visits to the scene, which may be based at least in part on data captured by third party electronic devices, how recently the object appeared in the scene, the consistency of the appearance of an object in a scene over time or over a number of visits to the scene, and the number of viewpoints of the object that have been captured by the electronic device or by other electronic devices. The map summarization module 150 generates summary maps of scenes based on sets of data representative of objects within the scene having utility weights above a threshold. By including only high utility weight data, the map summarization module 150 can restrict the size of the summary maps while improving the predictive quality of the data upon which the summary maps are based. The map summarization module 150 stores the summary maps of scenes and localizes the estimated pose of the electronic device 100 with respect to a summary map of the scene matching the image sensor data and the non-visual sensor data received from the visual and inertial sensors.

In operation, the electronic device 100 uses the image sensor data and the non-visual sensor data to track motion (estimate a pose) of the electronic device 100. In at least one embodiment, after a reset the electronic device 100 determines an initial estimated pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial estimated pose to reflect a current estimated pose, or tracked motion, of the device.

The electronic device 100 generates visual pose information based on the detection of spatial features in image data captured by one or more of the imaging sensors 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging sensors 114 and 116 capture wide angle imaging sensor image data 134 and narrow angle imaging sensor image data 136, respectively, that includes these spatial features of the hallway. In this example, the depth sensor 120 also captures depth data 138 that reflects the relative distances of these spatial features relative to the current pose of the electronic device 100. Further, the user-facing imaging sensor 118 captures image data representing head tracking data 140 for the current pose of the head 122 of the user 110. Non-visual sensor data 142, such as readings from the IMU, also is collected by the electronic device 100 in its current pose.

From this input data, the electronic device 100 can determine an estimate of its relative pose, or tracked motion, without explicit absolute localization information from an external source. To illustrate, the electronic device 100 can perform analysis of the wide-angle imaging sensor image data 134 and the narrow-angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-visual sensor data, such as gyroscopic data or accelerometer data, can be used to correlate spatial features observed in one image with spatial features observed in a subsequent image.

In at least one embodiment, the electronic device 100 uses the image data and the non-visual data to generate cues such as feature descriptors for the spatial features of objects identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") of a plurality of stored maps of the local environment 112 that each identifies previously identified spatial features and their corresponding poses. In at least one embodiment, each of the known feature descriptors is a descriptor that has previously been generated, and its pose definitively established, by either the electronic device 100 or another electronic device. The estimated device poses, 3D point positions, and known feature descriptors can be stored at the electronic device 100, at a remote server (which can combine data from multiple electronic devices) or other storage device, or a combination thereof. Accordingly, the comparison of the generated feature descriptors can be performed at the electronic device 100, at the remote server or other device, or a combination thereof.

In at least one embodiment, a generated feature descriptor is compared to a known feature descriptor by comparing each aspect of the generated feature descriptor (e.g., the orientation, scale, magnitude, strength, and/or descriptiveness of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the point position of the corresponding spatial feature and camera poses from which the corresponding spatial feature was seen. Thus, a known feature descriptor can include pose information indicating the location of the spatial feature within a specified coordinate system (e.g., a geographic coordinate system representing Earth) within a specified resolution (e.g., 1 cm), the orientation of the point of view of the spatial feature, the distance of the point of view from the feature and the like. The observed feature descriptors are compared to the feature descriptors stored in the map to identify multiple matched known feature descriptors. The matched known feature descriptors are then stored together with non-visual pose data as localization data that can be used both to correct drift in the tracked motion (or estimated pose) of the electronic device 100 and to augment the plurality of stored maps of a local environment for the electronic device 100.

In some scenarios, the matching process will identify multiple known feature descriptors that match corresponding generated feature descriptors, thus indicating that there are multiple features in the local environment of the electronic device 100 that have previously been identified. The corresponding poses of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors using conventional interpolation techniques. In some scenarios, if the variance between matching known feature descriptors is above a threshold, the electronic device 100 may snap its estimated pose to the pose indicated by the known feature descriptors.

In at least one embodiment, the map summarization module 150 generates estimated poses (i.e., tracks motion) of the electronic device 100 based on the image sensor data 134, 136 and the non-image sensor data 142 for output to an API. The map summarization module 150 also generates object data based on the image sensor data and the non-visual sensor data and identifies scenes composed of groups of objects appearing in relatively static configurations based on the object data. The map summarization module 150 identifies utility weights for the objects appearing in each scene, wherein the utility weights indicate a likelihood that the corresponding object will be persistently identifiable by the electronic device in the environment over time. For example, the map summarization module 150 can calculate a utility weight for an object based on one or more characteristics of the object, such as how many times the object was detected in the scene over a number of visits to the scene, how recently the object was detected in the scene, the consistency of the appearance of the object in the scene over time, how many viewpoints of the object have been detected in the scene, whether the object's appearance in the scene has been verified by other electronic devices, or a combination thereof. In some embodiments, the map summarization module 150 calculates a utility weight for an object by assigning a value such as 1 for each sighting of the object, a value of 0.5 for each viewpoint detected of the object, and adds a value of 0.5 for each sighting of the object within the last ten minutes.

The map summarization module 150 compares the utility weights for objects within a scene to a threshold, and generates a summary map of the scene that includes objects having utility weights above the threshold. In some embodiments, the map summarization module 150 discards or buffers object data corresponding to objects within the scene having utility weights below the threshold. As the map summarization module 150 identifies and updates utility weights for objects over time, it periodically updates the summary map of the scene, and may adjust the threshold so that the utility weight criterion for inclusion in the summary map increases over time and the amount of data included in the summary map is constrained. In some embodiments, the map summarization module 150 ensures that different areas of the environment 112 are substantially equally represented, such that the electronic device 100 can localize under multiple possible viewpoints independent of the utility weights of objects in a specific area.

In some embodiments, the software code for map summarization runs partially or fully either on the electronic device 100 or a remote server (not shown), allowing optimization of computational, network bandwidth, and storage resources. For example, in some embodiments the map summarization module 150 of the electronic device 100 selects high utility weight data to provide to the remote server, which in turn performs a global summarization of high utility weight data received from multiple electronic devices or users over time.

Figure 2:
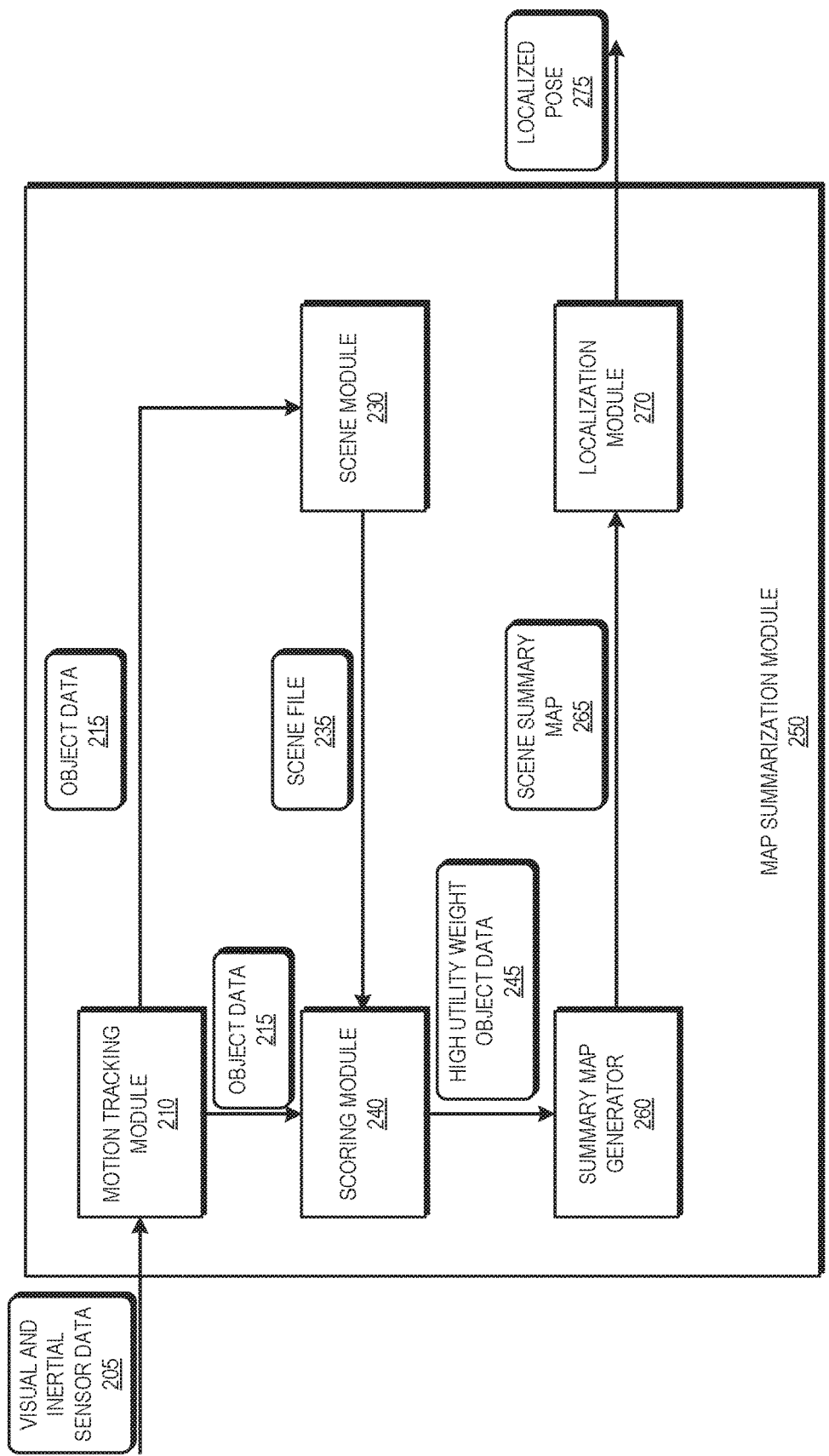
FIG. 2 is a diagram illustrating a map summarization module of the electronic device of FIG. 1 configured to generate a summary map of a scene based on an estimated utility of objects in the scene in accordance with at least one embodiment of the present disclosure.

FIG. 2 illustrates the components of a map summarization module 250 of the electronic device 100 of FIG. 1. The map summarization module 250 includes a motion tracking module 210, a scene module 230, a scoring module 240, a mapping module 260, and a localization module 270. In some embodiments, the motion tracking module 210 and/or the localization module 270 may be located remotely from the scene module 230, scoring module 240, and mapping module 260. Each of these modules represents hardware, software, or a combination thereof, configured to execute the operations as described herein. The map summarization module 250 is configured to output localized poses to an API module (not shown). The map summarization module 250 is configured to track motion to estimate a current pose of the electronic device and generate summary maps of scenes of the environment to localize the estimated current pose.

The motion tracking module 210 is configured to receive visual and inertial sensor data 205 from the imaging cameras 114 and 116, the depth sensor 120, and the non-image sensors (not shown) of FIG. 1. The motion tracking module 210 generates object data 215 from the received sensor data 205, which includes feature descriptors of spatial features of objects in the local environment 112. In some embodiments, the motion tracking module 210 stores a limited history of tracked motion (e.g., a single prior session, or a single prior time period). In some embodiments, the motion tracking module 210 estimates a current pose of the electronic device 100 by generating linearization points based on the generated feature descriptors and solving a non-linear estimation of the spatial features based on the linearization points and previously-generated linearization points based on stored limited history of tracked motion. In some embodiments, for purposes of solving the non-linear estimation of the spatial features, the front-end motion tracking module treats any previously-generated estimates of 3D point positions as a set of fixed values. Because the previously-generated linearization points are treated as non-variable, the computational burden of solving the non-linear estimation of the spatial features is lower than it would be if the previously-generated linearization points were treated as variable. However, any errors in the previously-generated linearization points may not be rectified by the solution of the non-linear estimation. Accordingly, the estimated current pose may differ from the actual current position and orientation of the electronic device 100.

The motion tracking module 210 provides the object data 215 to both the scene module 230 and the scoring module 240. The scene module 230 is configured to identify groups of objects appearing together in stable configurations over time based on the object data 215. In some embodiments, the scene module 230 stores object data based on visual and inertial sensor data 205 previously captured by the electronic device 100 and/or captured by other electronic devices. The scene module 230 identifies objects based on the object data 215 and compares the identified objects to objects identified in the stored object data to identify groups of two or more objects appearing together in stable configurations over time.

In some embodiments, the scene module 230 is configured to identify a change in object data 215 received from the motion tracking module 210 indicating that the electronic device 100 has exited a first scene and entered a second scene. For example, if the electronic device 100 traverses the hallway depicted in FIG. 1, the object data 215 generated by the motion tracking module 210 may include data representative of the three corners 124, 126, and 128, the baseboard 130, and the electrical outlet 132. Based on these object data 215, the scene module 230 may identify a scene denoted "hallway". If the electronic device 100 then enters a conference room (not shown) that has a table, chairs, windows, and artwork, the scene module 230 identifies that the electronic device has exited the hallway scene and entered a different scene, denoted "conference room". Upon identifying that the electronic device 100 has exited a first scene and entered a second scene, the scene module 230 partitions the object data 215 into the corresponding scenes files. For example, in some embodiments, the scene module 230 stores the data representative of objects identified as belonging to a first scene in a scene file 235, which the scene module 230 provides to the scoring module 240, and the scene module 230 stores the data representative of objects identified as belonging to a second scene in a second scene file (not shown), which the scene module 230 provides to the scoring module 230 or stores for later use. In some embodiments, the scene module 230 stores the data representative of objects identified as belonging to both the first and second scenes in a single scene file 235 with scene identifiers indicating to which scene the data corresponds. In some embodiments, the scene module 230 splits a single scene file 235 geographically into multiple scene files for large venue scenes.

The scoring module 240 is configured to receive object data 215 from the motion tracking module 210 and scene files 235 from the scene module 230. The scoring module 240 identifies utility weights for the objects appearing in a scene, wherein the utility weights indicate a likelihood that the object will be persistently identifiable by the electronic device 100 in the scene over time, such that objects with higher utility weights are object that are more useful for identifying the scene. To illustrate, some objects within a scene are transitory, such as people, animals, and portable objects that may be moved from one location to another within a short period of time. Such objects have limited usefulness for identifying a scene, because they may not be present at a subsequent visit to the scene. Other objects, such as corners of a room, windows, doors, and heavy furniture, are more likely to persist in their locations within the scene over time and over subsequent visits to the scene. Such objects are more useful for identifying the scene, because they are more likely to remain in their locations over time. In some embodiments, the scoring module 240 identifies a higher utility weight to object data when matching object data is verified by other electronic devices, which can involve semantic and scene understanding techniques. In some embodiments, the scoring module 240 is configured to utilize data generated during previous executions of the map summarization module 250 (referred to as historical data) to identify utility weights for object data. In some embodiments, the scoring module 240 utilizes machine-learning algorithms that leverage such historical data. The scoring module 240 is configured to identify utility weights for objects within a scene and compare the utility weights to a threshold. The scoring module 240 provides the object data having utility weights above the threshold (high utility weight object data) 245 to the mapping module 260.

The summary map generator 260 is configured to receive the high utility weight object data 245 for each scene file 235 and generate a scene summary map 265 for each scene based on the high utility weight object data 245 associated with the scene. In some embodiments, the summary map generator 260 is configured to store a plurality of scene summary maps (not shown) including high utility weight object data and to receive updated high utility weight object data 245 from the scoring module 240. The stored plurality of scene summary maps form a compressed history of the scenes previously traversed by the electronic device 100 and by other electronic devices that share data with the electronic device 100. The summary map generator 260 is configured to update the stored plurality of scene summary maps to incorporate the high utility weight object data 245 received from the scoring module 240. In some embodiments, the summary map generator 260 receives high utility weight object data 245 from the scoring module 240 periodically, for example, every five seconds. In some embodiments, the summary map generator 260 receives high utility weight object data 245 from the scoring module 240 after a threshold amount of sensor data has been received by the motion tracking module 210. In some embodiments, the summary map generator 260 receives high utility weight object data 245 from the scoring module 240 after the scene module 230 identifies that the electronic device 100 has exited a scene.

The summary map generator 260 builds a scene summary map 265 of the scene based on the high utility weight object data of the stored plurality of scene summary maps and the high utility weight object data 245 received from the scoring module 240. The summary map generator 260 matches the one or more spatial features of objects represented by the high utility weight data 245 to spatial features of objects represented by the plurality of stored scene summary maps to generate an updated scene summary map of a scene of the electronic device 100. In some embodiments, the summary map generator 260 searches each batch of high utility weight object data 245 to determine any matching known feature descriptors of the stored plurality of maps. The summary map generator 260 provides the scene summary map 265 of the scene to the localization module 270.

The localization module 270 is configured to align the estimated pose 214 with the stored plurality of maps, such as by applying a loop-closure algorithm. Thus, the localization module 270 can use matched feature descriptors to estimate a transformation for one or more of the stored plurality of maps, whereby the localization module 270 transforms geometric data associated with the generated feature descriptors of the estimated pose 214 having matching descriptors to be aligned with geometric data associated with a stored map having a corresponding matching descriptor. When the localization module 270 finds a sufficient number of matching feature descriptors from the generated feature descriptors 215 and a stored map to confirm that the generated feature descriptors 215 and the stored map contain descriptions of common visual landmarks, the localization module 270 computes the transformation between the generated feature descriptors 215 and the matching known feature descriptors, aligning the geometric data of the matching feature descriptors. Thereafter, the localization module 270 can apply a co-optimization algorithm to refine the alignment of the pose and scene of the estimated pose 214 of the electronic device 100 to generate a localized pose 275.

Figure 3:
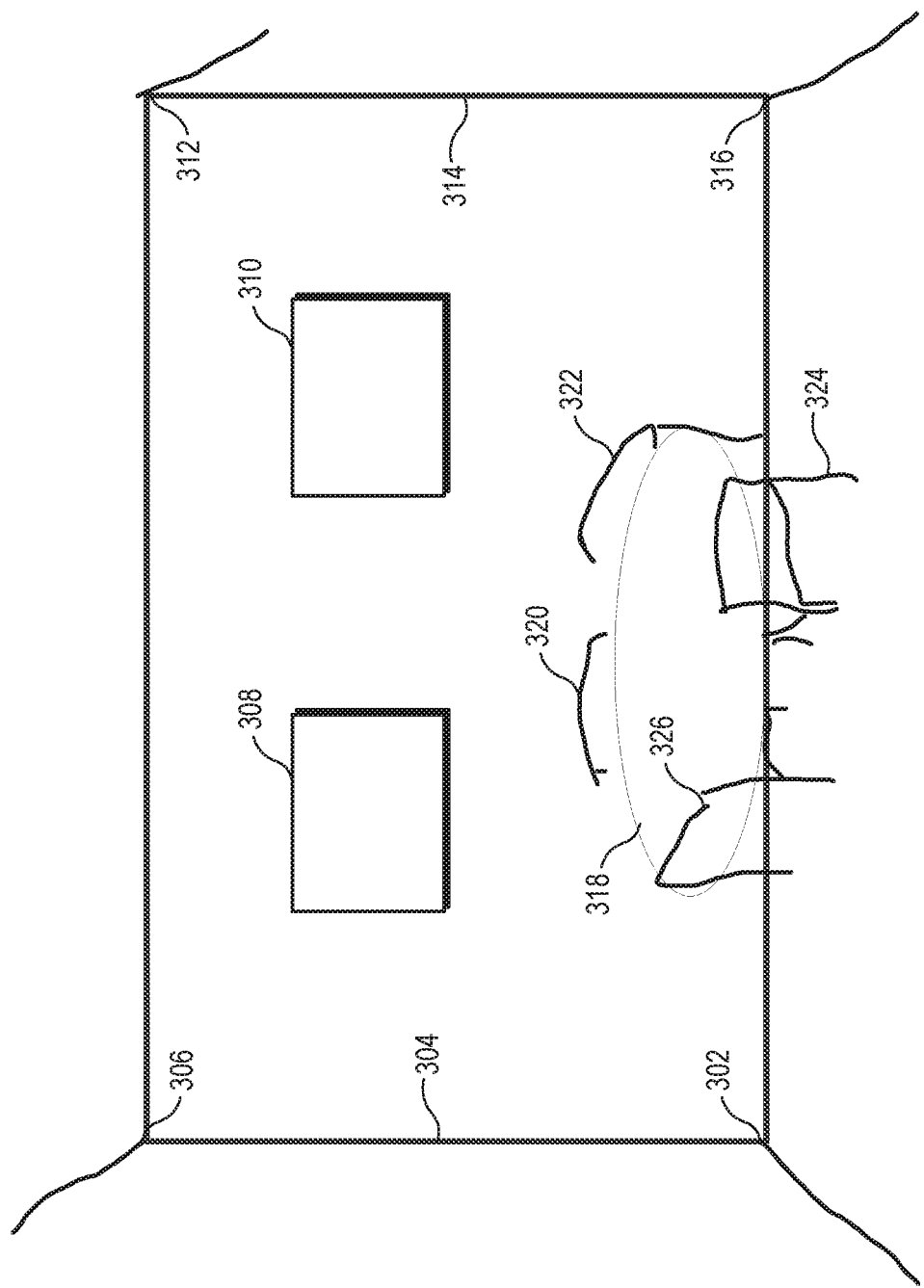
FIG. 3 is a diagram illustrating a scene of the electronic device of FIG. 1 having a plurality of objects having varying utilities for identifying the scene in accordance with at least one embodiment of the present disclosure.

FIG. 3 illustrates a scene 300 including a view of a conference room containing corners 302, 306, 312, 316, edges 304, 314, windows 308, 310, a table 318, and chairs 320, 322, 324, 326, collectively referred to as objects. The objects within the scene 300 have varying likelihoods of persistence in the scene 300 over time. For example, the corners 302, 306, 312, 316, edges 304, 314, and windows 308, 310 have a high likelihood of persistence over time, because their locations and appearance are unlikely to change. By contrast, the table 318 has a likelihood of persistence in the scene 300 that is lower than that of the corners 302, 306, 312, 316, edges 304, 314, and windows 308, 310, because the table 318 could be reoriented within the scene 300 or removed from the scene 300. The chairs 320, 322, 324, 326 have a likelihood of persistence in the scene 300 that is lower than that of the table 318, because the chairs 320, 322, 324, 326 are more likely to be moved, reoriented, or removed from the scene 300. Although not illustrated in FIG. 3, it is understood that people are likely to have an even lower likelihood of persistence within the scene 300, because they are mobile and can be expected to move, reorient, and remove themselves from the scene 300 with relative frequency. Accordingly, upon the electronic device 100 of FIG. 1 encountering the scene 300, the scoring module 240 of the map summarization module 250 of FIG. 2 identifies relatively high utility weights to the corners 302, 306, 312, 316, edges 304, 314, and windows 308, 310, an intermediate utility weight to the table 318, and relatively low utility weights to the chairs 320, 322, 324, 326.

Figure 4:
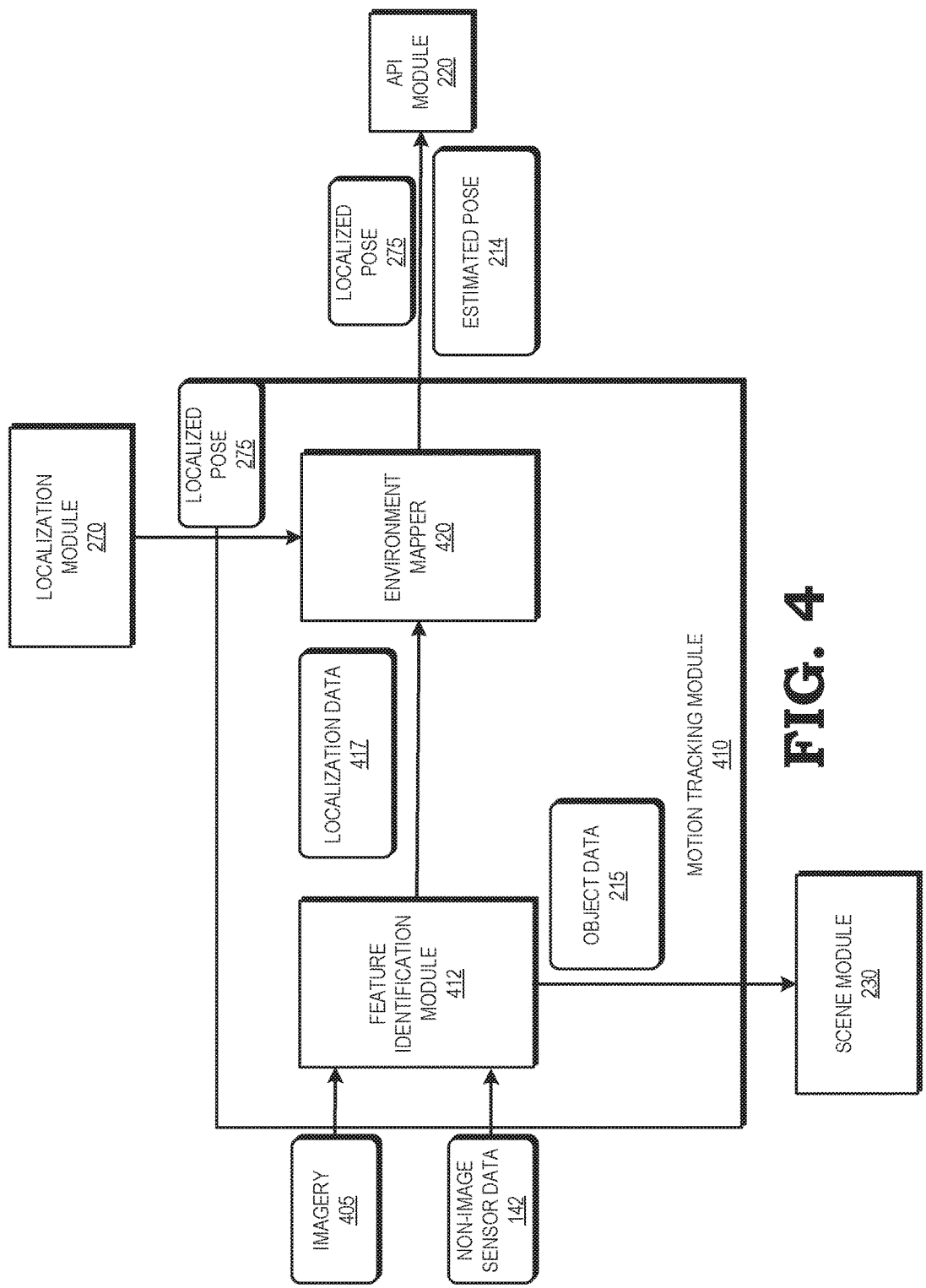
FIG. 4 is a diagram illustrating a motion tracking module of the map summarization module of FIG. 2 configured to track motion of the electronic device 100 of FIG. 1 and generate object data including feature descriptors based on captured sensor data in accordance with at least one embodiment of the present disclosure.

FIG. 4 is a diagram illustrating a motion tracking module of the map summarization module of FIG. 2 configured to track motion of the electronic device 100 of FIG. 1 and generate object data including semantic data, pixel data, and/or feature descriptors based on captured sensor data in accordance with at least one embodiment of the present disclosure. The motion tracking module 410 includes a feature identification module 412 and an environment mapper 420. Each of these modules represents hardware, software, or a combination thereof, configured to execute the operations as described herein. In particular, the feature identification module 412 is configured to receive imagery 405, representing images captured by the imaging sensors 114, 116, 118, and the non-visual sensor data 142. Based on this received data, the feature identification module 412 identifies features of objects in the imagery 405 by generating feature descriptors of objects (referred to as object data) 215 and comparing the object data 215 to known object data from the stored limited history of tracked motion as described above with respect to FIG. 2. The feature identification module 412 provides the generated object data 215 to the scene module 230. The feature identification module 412 additionally stores the object data 215, together with any associated non-visual data, as localization data 417. In at least one embodiment, the localization data 417 can be used by the electronic device 100 to estimate one or more poses of the electronic device 100 as it is moved through different locations and orientations in its local environment. These estimated poses can be used in conjunction with previously generated and stored map information for the local environment to support or enhance location based services of the electronic device 100.

The environment mapper 420 is configured to generate or modify a locally accurate estimated pose 214 of the electronic device 100 based on the localization data 417. In particular, the environment mapper 420 analyzes the feature descriptors in the localization data 417 to identify the location of the features in a frame of reference for the electronic device 100. For example, each feature descriptor can include location data indicating a relative position of the corresponding feature from the electronic device 100. In some embodiments, the environment mapper 420 generates linearization points based on the localization data 417 and solves a non-linear estimation, such as least squares, of the environment based on the linearization points and previously-generated linearization points based on the stored feature descriptors from the stored limited history of tracked motion. The environment mapper 420 estimates the evolution of the device pose over time as well as the positions of 3D points in the environment 112. To find matching values for these values based on the sensor data, the environment mapper 420 solves a non-linear optimization problem. In some embodiments, the environment mapper 420 solves the non-linear optimization problem by linearizing the problem and applying standard techniques for solving linear systems of equations. In some embodiments, the environment mapper 420 treats the previously-generated linearization points as fixed for purposes of solving the non-linear estimation of the environment. The environment mapper 420 can reconcile the relative positions of the different features to identify the location of each feature in the frame of reference, and store these locations in a locally accurate estimated pose 214. The motion tracking module 410 provides and updates the estimated pose 214 to an API module 240 of the electronic device 100 to, for example, generate a virtual reality display of the local environment.

The environment mapper 420 is also configured to periodically query the localization module 270 for an updated localized pose 275. When an updated localized pose 275 is available, the localization module 270 provides the updated localized pose 275 to the environment mapper 420. The environment mapper 420 provides the updated localized pose 275 to the API module 230.

Figure 5:
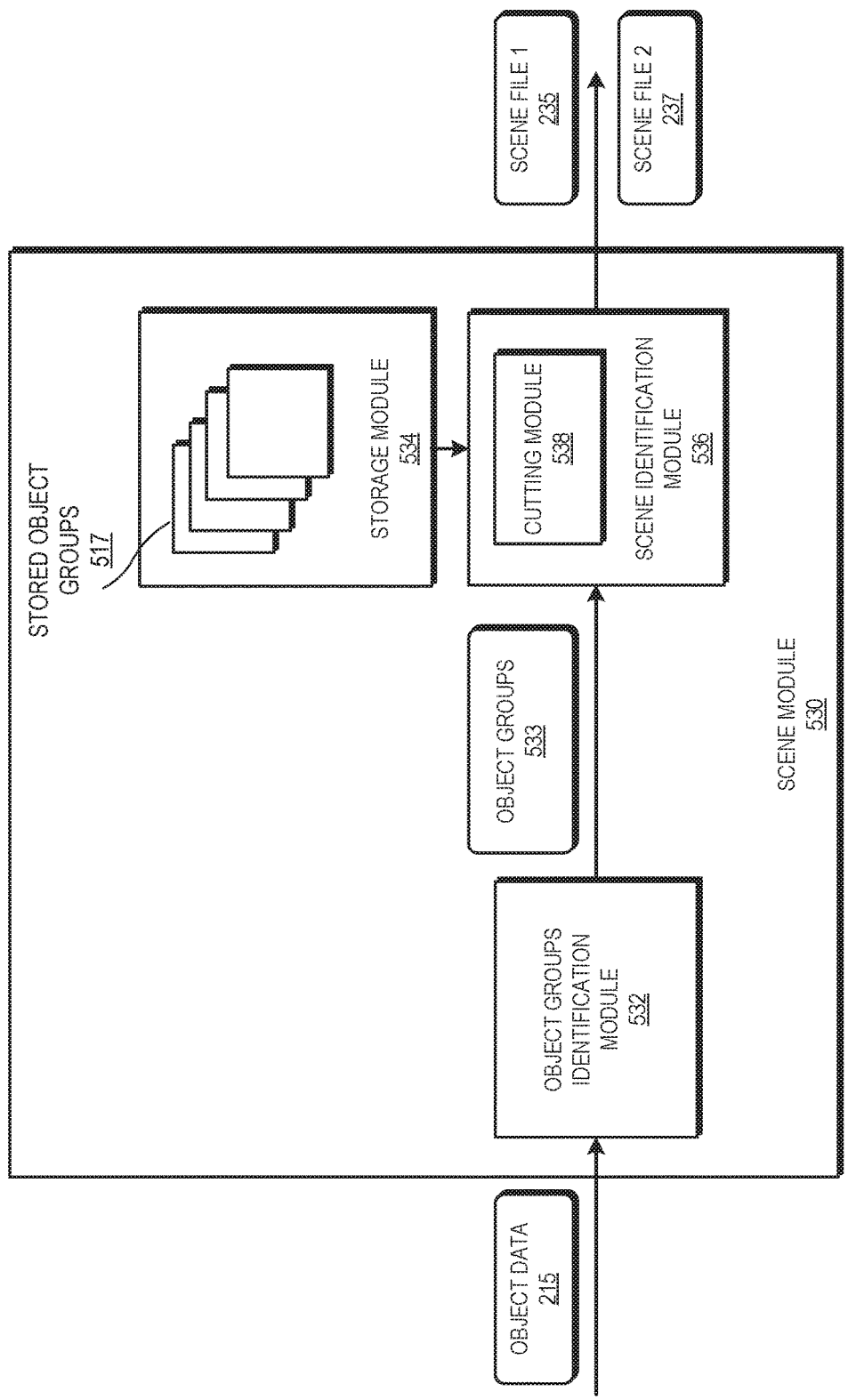
FIG. 5 is a diagram illustrating a scene module of the map summarization module of FIG. 2 configured to identify a scene of the electronic device of FIG. 1 based on object groups in accordance with at least one embodiment of the present disclosure.

FIG. 5 is a diagram illustrating a scene module 530 of the map summarization module 250 of FIG. 2 configured to identify scenes of stable configurations of objects based on captured and stored object data including generated feature descriptors in accordance with at least one embodiment of the present disclosure. The scene module 530 includes an object groups identification module 532, a storage module 534, and a scene identification module 536.

The object groups identification module 532 is configured to receive object data 215 from the motion tracking module 210 of FIG. 2 and identify objects groups 523 within the environment 112 based on a consistency and configuration of object data 215 over time. The object groups identification module 532 provides the identified object groups 533 to the scene identification module 536 including a cutting module 538.

The storage module 534 is configured to store a plurality of sets of object data 517 representing objects perceived in the environment of the electronic device 100. In some embodiments, the sets of object data 517 may include sets of object data that were previously generated by the electronic device 100 during prior mapping sessions. In some embodiments, the sets of object data 517 may also include VR or AR maps that contain features not found in the physical environment of the electronic device 100. The sets of object data 517 include stored (known) feature descriptors of spatial features of objects in the environment that can collectively be used to generate three-dimensional representations of objects in the environment.

The scene identification module 536 is configured to receive identified object groups 533 from the object groups identification module 532. The scene identification module 536 compares the identified object groups 533 to the stored objects 517. The scene identification module 536 identifies groups of objects appearing together in the environment in stable configurations over time based on the stored object data 517 and the identified object groups 533 received from the object groups identification module 532. If the scene identification module 536 identifies one or more groups of objects appearing together in a configuration having a stability above a first threshold, referred to as a scene, the scene identification module 536 generates a scene file 235 including object data representative of the scene.

In some embodiments, if the scene identification module 536 identifies that the object groups 533 received from the object groups identification module 532 include fewer than a threshold number of objects matching the object groups received over a recent time period, the scene identification module 536 identifies that the electronic device 100 has exited a first scene and entered a second scene. For example, if the electronic device 100 had been in the conference room scene 300 of FIG. 3, and then exits the conference room scene 300 to enter the hallway scene of FIG. 1, the scene identification module 536 identifies that the object groups represented by sensor data captured in the time period that the electronic device 100 is in the hallway scene do not match the object groups represented by sensor data captured in the time period that the electronic device 100 was in the conference room scene. In response to identifying that the electronic device 100 has exited a first scene and entered a second scene, the cutting module 538 of the scene identification module 536 partitions the object groups 533 received from the object groups identification module 532 into separate scene files 235, 237. The scene module 230 provides the scene files 235, 237 to the scoring module 240 of the map summarization module 250 of FIG. 2.

Figure 6:
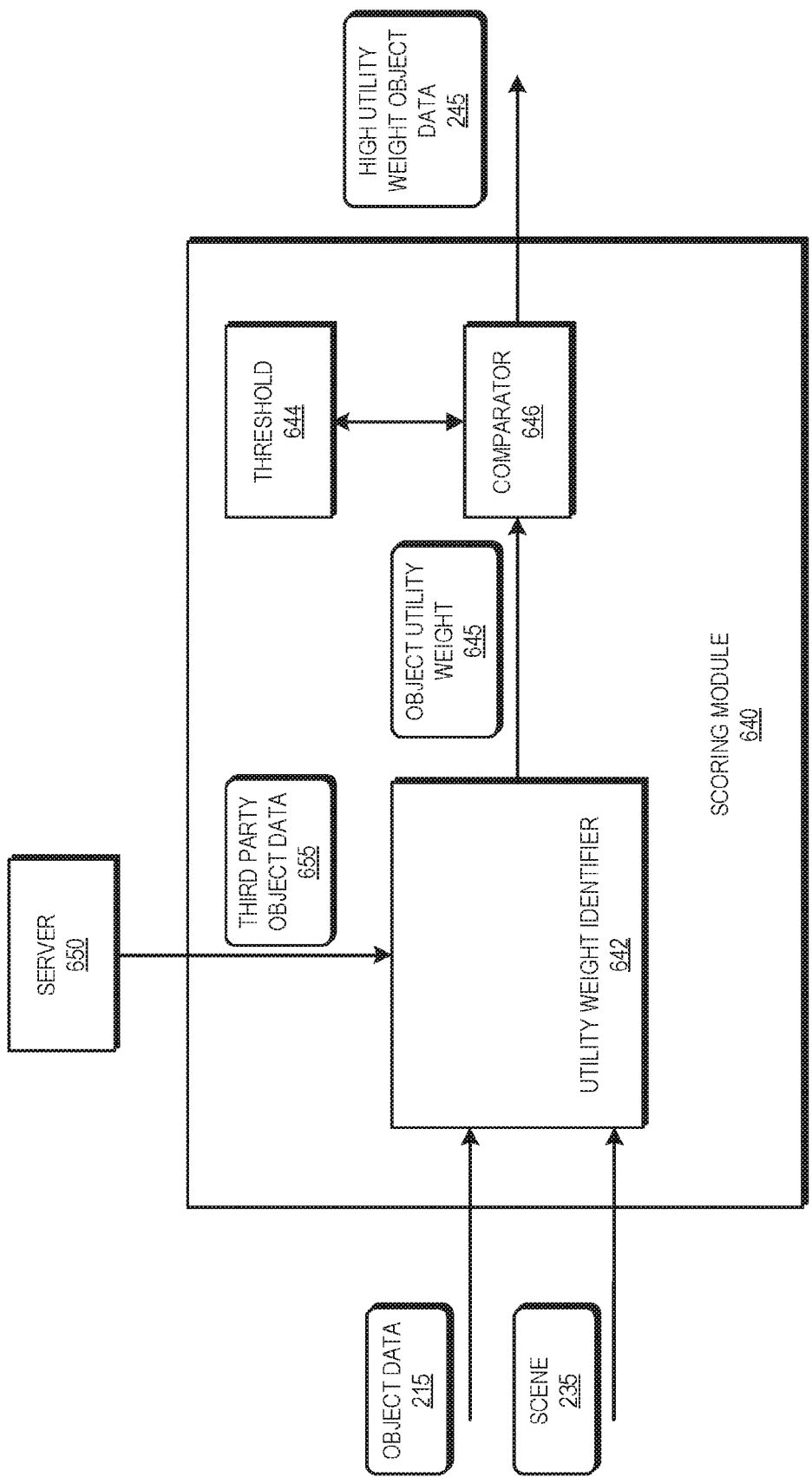
FIG. 6 is a diagram illustrating a scoring module of the map summarization module of FIG. 2 configured to identify utility weights for objects indicating a predicted likelihood that the corresponding object will be persistently identifiable by the electronic device in the environment over time in accordance with at least one embodiment of the present disclosure.

FIG. 6 is a diagram illustrating a scoring module 640 of the map summarization module 250 of FIG. 2 configured to identify utility weights for objects indicating a predicted likelihood that the corresponding object will be persistently identifiable by the electronic device 100 of FIG. 1 in the environment over time in accordance with at least one embodiment of the present disclosure. The scoring module 640 includes a utility weight identifier 642, a threshold 644, and a comparator 646.

The utility weight identifier 642 is configured to receive object data 215 from the motion tracking module 210, third party object data 655 from a server 650, and scene files 235 from the scene module 230. The utility weight identifier 642 identifies utility weights 645 for the objects represented by the object data 215. The utility weights 645 indicate a predicted likelihood that the corresponding objects will be persistently identifiable in the environment over time. The utility weights are based on metric such as how many times the object was detected in the scene over a number of visits to the scene, how recently the object was detected in the scene, the consistency of the appearance of the object in the scene over time, how many viewpoints of the object have been detected in the scene, and whether the object's appearance in the scene has been verified by third party object data 655 captured by other electronic devices that have also traversed the scene.

The utility weight identifier 642 provides the identified utility weights corresponding to objects represented in the scene file 235 to the comparator 646. The comparator 646 is configured to compare the identified object utility weights 645 received from the utility weight identifier 642 to a threshold 644. If the object utility weights 645 are above the threshold 644, the comparator 646 provides the object data having utility weights over the threshold 644 to the summary map generator 260 of FIG. 2. If the object utility weights 645 are at or below the threshold 644, the comparator 646 discards or buffers the object data having utility weights at or below the threshold 644.

Figure 7:
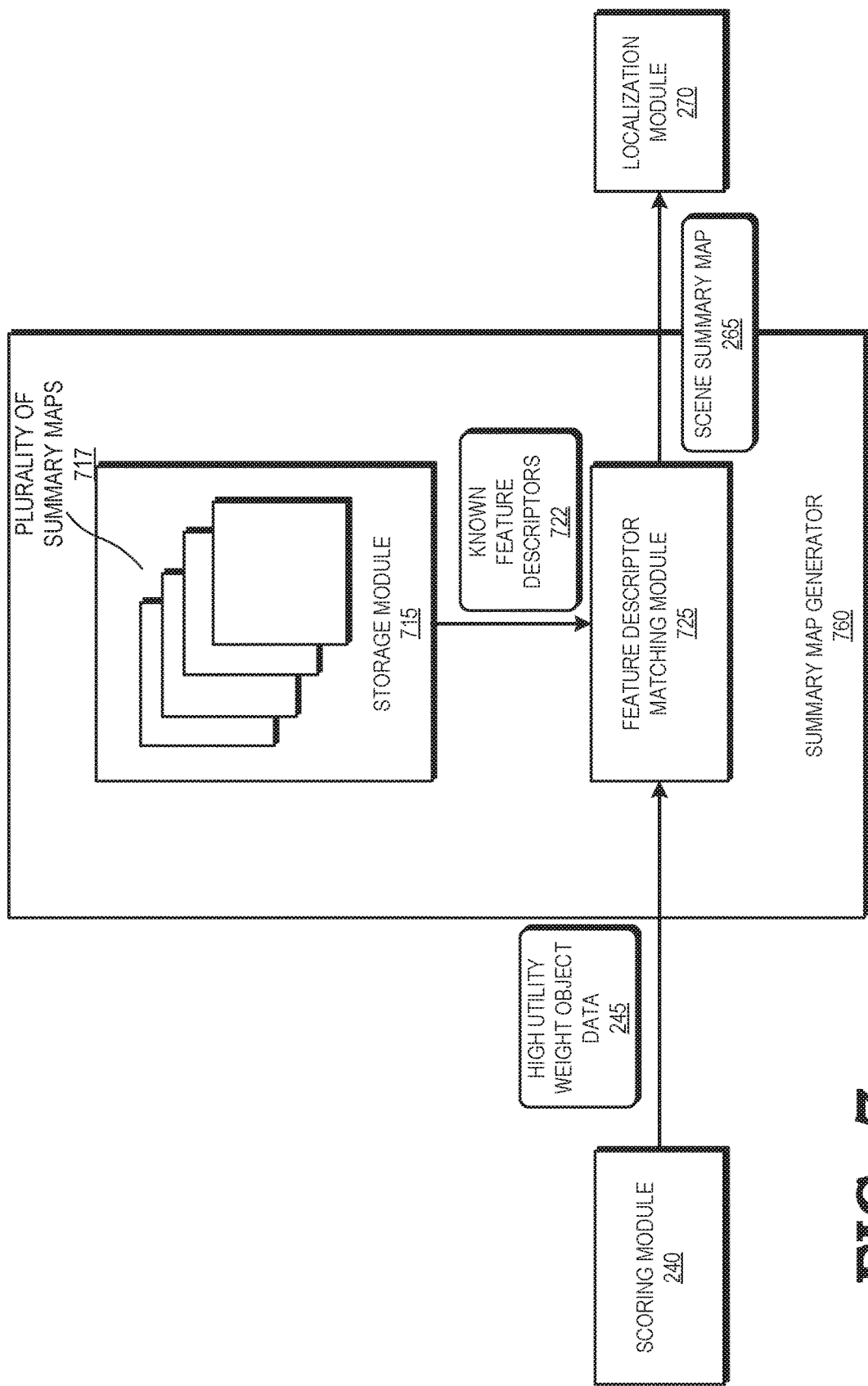
FIG. 7 is a diagram illustrating a summary map generator of the map summarization module of FIG. 2 configured to generate a summary map of a scene based on an estimated utility of objects in the scene in accordance with at least one embodiment of the present disclosure.

FIG. 7 is a diagram illustrating a summary map generator 760 of the map summarization module 250 of FIG. 2 configured to generate a summary map of a scene 265 based on data representative of objects identified as having high utility for identifying the scene 245 in accordance with at least one embodiment of the present disclosure. The summary map generator 760 includes a feature descriptor matching module 725 and a storage module 715.

The storage module 715 is configured to store a plurality of scene summary maps 717 of scenes of the environment of the electronic device 100. In some embodiments, the plurality of maps 717 may include maps that were previously generated by the electronic device 100 during prior mapping sessions. In some embodiments, the plurality of scene summary maps 717 may also include VR or AR maps that contain features not found in the physical environment of the electronic device 100. The plurality of scene summary maps 717 include stored (known) high utility weight object data 722 representative of spatial features of objects in the scene identified as being likely to persist over time that can collectively be used to generate a compressed three-dimensional representation referred to as a scene summary map 265 of the scene.

The feature descriptor matching module 725 is configured to high utility weight object data 245 from the scoring module 240. The feature descriptor matching module 725 compares the feature descriptors of the high utility weight object data 245 to the feature descriptors of the stored high utility weight object data 722. The feature descriptor matching module 725 builds a scene summary map 265 of the scene of the electronic device 100 based on the known feature descriptors 722 of the stored plurality of maps 717 and the high utility weight object data 245 received from the scoring module 240.

In some embodiments, the feature descriptor matching module 725 adds the high utility weight object data 245 received from the scoring module 240 by generating linearization points based on the generated feature descriptors of the object data and solving a non-linear estimation of the three-dimensional representation based on the linearization points and previously-generated linearization points based on the known feature descriptors 722. In some embodiments, the previously-generated linearization points are considered variable for purposes of solving the non-linear estimation of the three-dimensional representation. The feature descriptor matching module 4725 provides the scene summary map 265 to the localization module 270.

Figure 8:
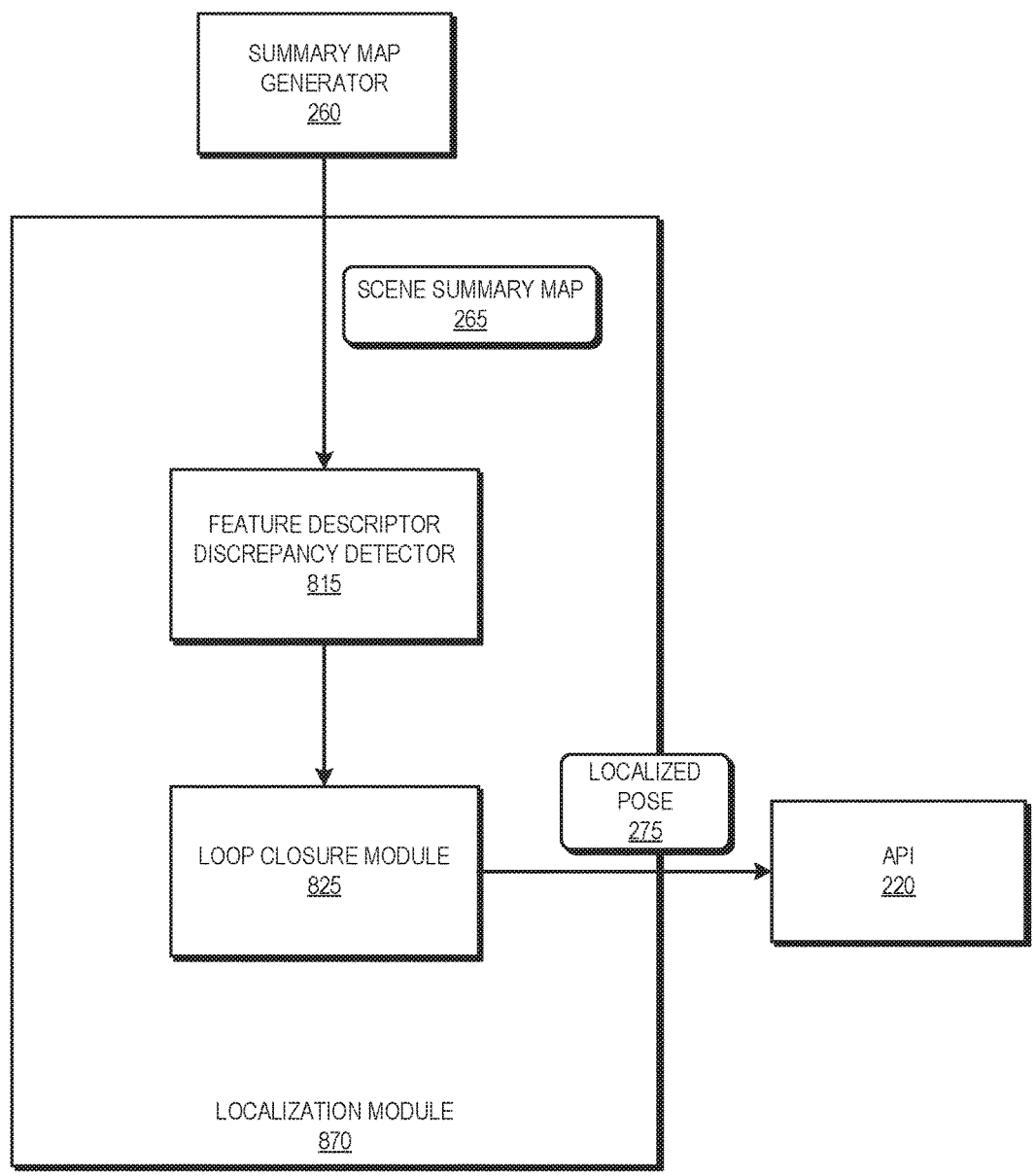
FIG. 8 is a diagram illustrating a localization module of the map summarization module of FIG. 2 configured to generate a localized pose of the electronic device in accordance with at least one embodiment of the present disclosure.

FIG. 8 is a diagram illustrating a localization module 870 of the map summarization module 250 of FIG. 2 configured to generate a localized pose 275 of the electronic device 100 in accordance with at least one embodiment of the present disclosure. The localization module 870 includes a feature descriptor discrepancy detector 815 and a loop closure module 825.

The feature descriptor discrepancy detector 815 is configured to receive a scene summary map 265 of the scene from the summary map generator 260 of the map summarization module 250. The feature descriptor discrepancy detector 815 analyses the matched feature descriptors of the scene summary map 265 and identifies discrepancies between matched feature descriptors. The feature descriptor discrepancy detector 815 transforms geometric data associated with the generated feature descriptors of the estimated pose 214 having matching descriptors to be aligned with geometric data associated with a stored scene summary map having a corresponding matching descriptor. When the localization module 870 finds a sufficient number of matching feature descriptors from the generated feature descriptors 215 and a stored scene summary map to confirm that the generated feature descriptors 215 and the stored scene summary map contain descriptions of common visual landmarks, the localization module 870 computes a transformation between the generated feature descriptors 215 and the matching known feature descriptors, aligning the geometric data of the matching feature descriptors.

The loop closure module 825 is configured to find a matching pose of the device given the 3D position points in the environment and their observations in the current image by solving a co-optimization algorithm to refine the alignment of the matching feature descriptors. The co-optimization problem may be solved by a Gauss-Newton or Levenberg-Marquardt algorithm, or another algorithm for optimizing transformations to generate a localized pose 275 of the electronic device 100. In some embodiments, the loop closure module 825 treats known feature descriptors as variable. The loop closure module 825 thus generates a localized pose 275 that corrects drift in the estimated pose 214, and sends the localized pose 235 to the motion tracking module 210. The localized pose 275 can be fed to an application executing at the electronic device 100 to enable augmented reality or other location-based functionality by allowing the electronic device 100 to more efficiently and accurately identify a scene that it has previously traversed.

Figure 9:
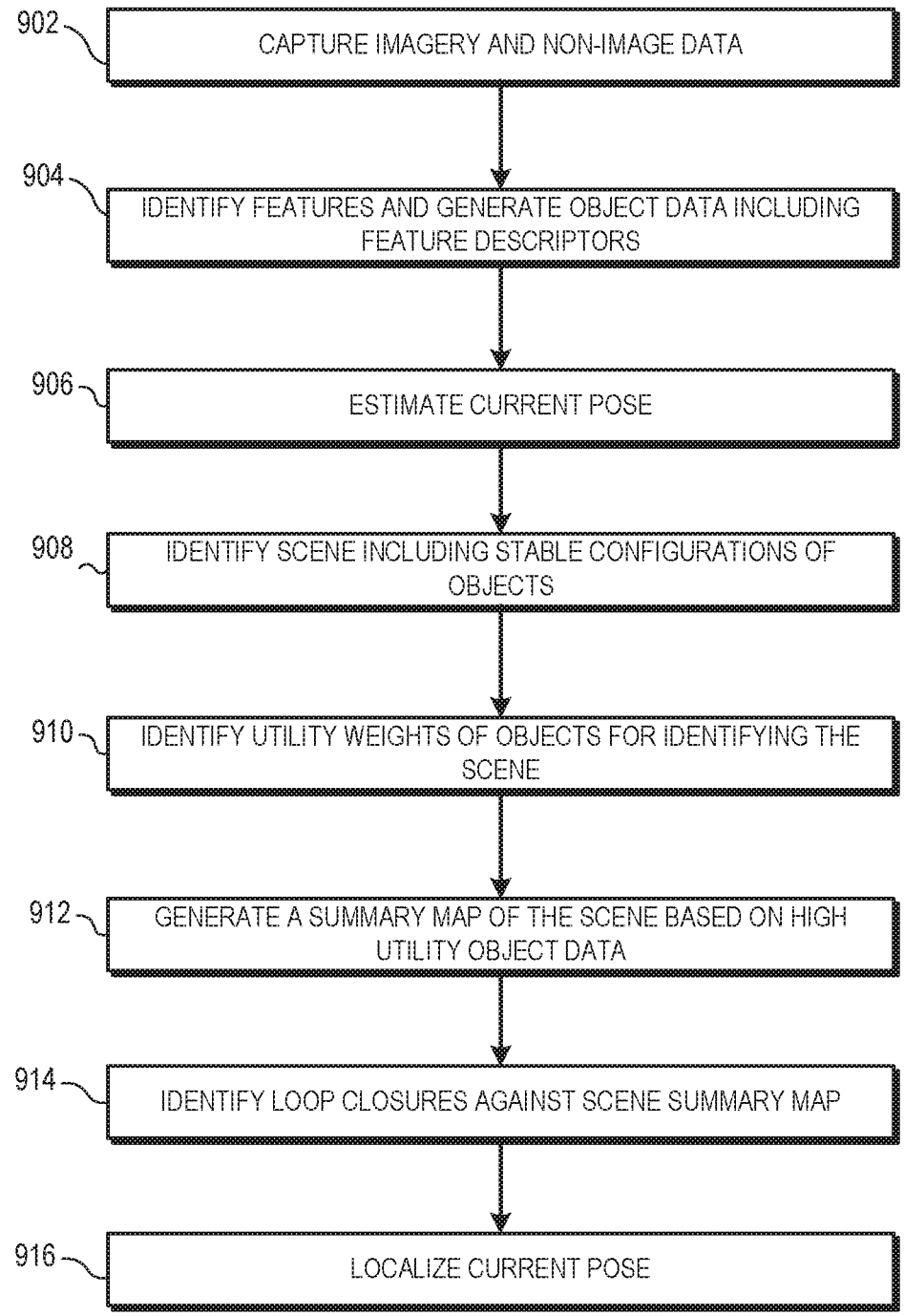
FIG. 9 is a flow diagram illustrating an operation of an electronic device to generate a summary map of a scene based on an estimated utility of objects and localizing the estimated current pose with respect to the summary map in accordance with at least one embodiment of the present disclosure.

FIG. 9 is a flow diagram illustrating an operation of an electronic device to generate a summary map of a scene based on data representative of objects having a high utility for identifying the scene when estimating a current pose of the electronic device and localizing the estimated current pose with respect to the summary map in accordance with at least one embodiment of the present disclosure. The method 900 initiates at block 902 where the electronic device 100 captures imagery and non-visual data as it is moved by a user through different poses in a local environment. At block 904, the motion tracking module 210 identifies features of the local environment based on the imagery 305 and non-image sensor data 142, and generates object data including feature descriptors 215 for the identified features for the scene module 230 and localization data 417. At block 906, the motion tracking module 210 uses the localization data 417 to estimate a current pose 214 of the electronic device 100 in the local environment 112. The estimated pose 214 can be used to support location-based functionality for the electronic device 100. For example, the estimated pose 214 can be used to orient a user of the electronic device 100 in a virtual reality or augmented reality application executed at the electronic device 100.

At block 908, the scene module 230 identifies a scene including stable configurations of objects represented by the object data 215. At block 910, the scoring module 240 identifies utility weights for objects appearing in the identified scene, wherein the utility weights indicate a predicted likelihood that the corresponding object will be persistently identifiable by the electronic device 100 in the scene over time. At block 912, the summary map generator 260 builds and/or updates a three-dimensional compressed representation, referred to as a scene summary map, 265 of the scene in the environment of the electronic device, which it provides to the localization module 270. At block 914, the localization module 270 identifies discrepancies between matching feature descriptors and performs a loop closure to align the estimated pose 214 with the scene summary map 265. At block 916, the localization module 270 localizes the current pose of the electronic device, and the map summarization module 250 provides the localized pose to an API module 230.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   generating, at an electronic device, a first set of data representative of one or more objects in an environment of the electronic device, wherein the first set of data is based on images captured from one or more visual sensors and non-visual data from one or more non-visual sensors;
   identifying, based on the first set of data, a first set of one or more groups of objects, wherein each group comprises objects appearing together in a configuration in the environment
   identifying a first scene comprising the first set of one or more groups of objects based on a consistency with which the configuration appears over time or over a plurality of motion tracking sessions being above a first threshold;
   identifying a utility weight of each of the one or more objects for identifying the first scene, the utility weight indicating a predicted likelihood that the corresponding object will be persistently identifiable by the electronic device in the first scene over time and based at least in part on verification by one or more mobile devices;
   generating a three-dimensional representation of the first scene based a subset of the first set of data representative of a subset of the one or more objects in the first scene, wherein the subset of the one or more objects comprises objects having utility weights above a threshold, wherein the subset of the first set of data is limited to a threshold amount of data; and
   localizing, at the electronic device, an estimated current pose of the electronic device based on the three-dimensional representation of the first scene.

2. The method of claim 1, further comprising updating the utility weight of a first object included in the subset based on generating, at the electronic device, additional data representative of the first object.

3. The method of claim 1, further comprising:
   receiving a second set of data representative of one or more objects in the first scene from a set of one or more mobile devices;
   identifying a utility weight for identifying the first scene of each of the one or more objects represented by the second set of data; and
   updating the three-dimensional representation of the first scene, wherein updating comprises adding to the three-dimensional representation data representative of a subset of the one or more objects represented by the second set of data, wherein the subset comprises objects having utility weights above the threshold.

4. The method of claim 3, further comprising updating the utility weight of a first object included in the subset based on receiving, at the electronic device, additional data representative of the first object.

5. The method of claim 1, wherein the utility weight is based on a persistence of the object over a number of visits to the first scene.

6. The method of claim 1, wherein the utility weight is based on how recently data representative of the object was generated.

7. The method of claim 1, wherein the utility weight is based on a consistency of the appearance of the object over time.

8. A method, comprising:
generating, at an electronic device, first data representative of one or more objects in an environment of the electronic device, wherein the first data is based on images captured from one or more visual sensors and non-visual data from one or more non-visual sensors;
identifying a first set of one or more groups of objects wherein each group comprises objects appearing together in a configuration in the environment;
identifying a first scene comprising the first set of one or more groups of objects based on a consistency with which the configuration appears over time or over a plurality of motion tracking sessions being above a first threshold, the consistency based at least in part on verification by one or more mobile devices; and
generating a reference map of the first scene based on a subset of the first data, the subset representative of the first set of one or more groups of objects, wherein the subset of the first data is limited to a threshold amount of data.

9. The method of claim 8, further comprising:
localizing, at the electronic device, an estimated current pose of the electronic device based on the reference map of the first scene.

10. The method of claim 8, further comprising:
generating, at an electronic device, second data representative of one or more objects in an environment of the electronic device, wherein the second data is based on images captured from one or more visual sensors and non-visual data from one or more non-visual sensors;
comparing the one or more objects represented by the second data to the objects comprising the one or more groups of objects comprising the first scene; and
in response to identifying that objects represented by the second data generated at the electronic device have a correlation to the objects comprising the one or more groups of objects in the first scene that is below a second threshold, identifying a second set of one or more groups of objects represented by the second data wherein each group comprises objects appearing in a configuration;
identifying a second scene comprising the second set of one or more groups of objects based on the consistency with which the configuration appears being above the first threshold;
generating a reference map of the second scene based on the second data; and
localizing, at the electronic device, an estimated current pose of the electronic device based on the reference map of the second scene.

11. The method of claim 8, further comprising:
identifying, at the electronic device, a utility weight of each of the one or more objects for identifying a scene, the utility weight indicating a predicted likelihood that the corresponding object will be persistently identifiable by the electronic device in the environment over time and based at least in part on verification by one or more mobile devices; and
wherein generating the reference map comprises basing the reference map on a subset of the first data representative a subset of the one or more objects in the environment, wherein the subset of the one or more objects comprises objects having utility weights above a third threshold.

12. The method of claim 11, further comprising:
receiving third data representative of one or more objects in the environment of the electronic device from a set of one or more mobile devices;
comparing the one or more objects represented by the third data to the objects comprising the one or more groups of objects comprising the first scene;
identifying a utility weight of each of the one or more objects represented by the third data, the utility weight indicating a predicted likelihood that the corresponding object will be persistently identifiable by the electronic device in the environment over time and based at least in part on verification by one or more mobile devices; and
updating the reference map of the first scene, wherein updating comprises adding to the reference map data representative of a subset of the one or more objects represented by the third data, wherein the subset comprises objects having utility weights above the threshold.

13. The method of claim 12, wherein the utility weight is based on a persistence of the object over a number of visits to the environment.

14. The method of claim 12, wherein the utility weight is based on how recently data representative of the object was generated.

15. The method of claim 12, wherein the utility weight is based on a consistency of the appearance of the object over time.

16. A non-transitory computer-readable storage medium embodying a set of executable instructions, the set of executable instructions to manipulate at least one processor to:
generate a first set of data representative of one or more objects in an environment of an electronic device, wherein the first set of data is based on images captured from one or more visual sensors and non-visual data from one or more non-visual sensors;
identify a first set of one or more groups of objects wherein each group comprises objects appearing together in a configuration in the environment;
identify a first scene comprising the first set of one or more groups of objects based on the consistency with which the configuration appears over time or over a plurality of motion tracking sessions being above a first threshold;
identify a utility weight for each of the one or more objects comprising the first scene, wherein the utility weight indicates a predicted likelihood that the corresponding object will be persistently identifiable by the electronic device in the environment over time and is based at least in part on verification by one or more mobile devices;
generate a reference map of the first scene based on a subset of the first set of data representative of a subset of the one or more objects comprising the first scene, wherein the subset of the one or more objects comprises objects having utility weights above a threshold, and wherein the subset of the first set of data is limited to a threshold amount of data; and localize an estimated current pose of the electronic device based on the reference map of the first scene.

17. The non-transitory computer-readable storage medium of claim 16, wherein the utility weight for each of the one or more objects is based on a comparison of data representative of one or more objects in the environment of the electronic device received from a set of one or more mobile devices to the subset of the first set of data upon which the reference map is based.

\* \* \* \* \*